Sept. 18, 1934.    A. E. ELLINGER    1,974,207
MECHANISM FOR SELECTIVELY CONTROLLING THE ANGULAR MOVEMENT OF A SHAFT
Filed Feb. 18, 1929    3 Sheets-Sheet 1

Inventor
Albert E. Ellinger
By Popp and Powers
Attorney

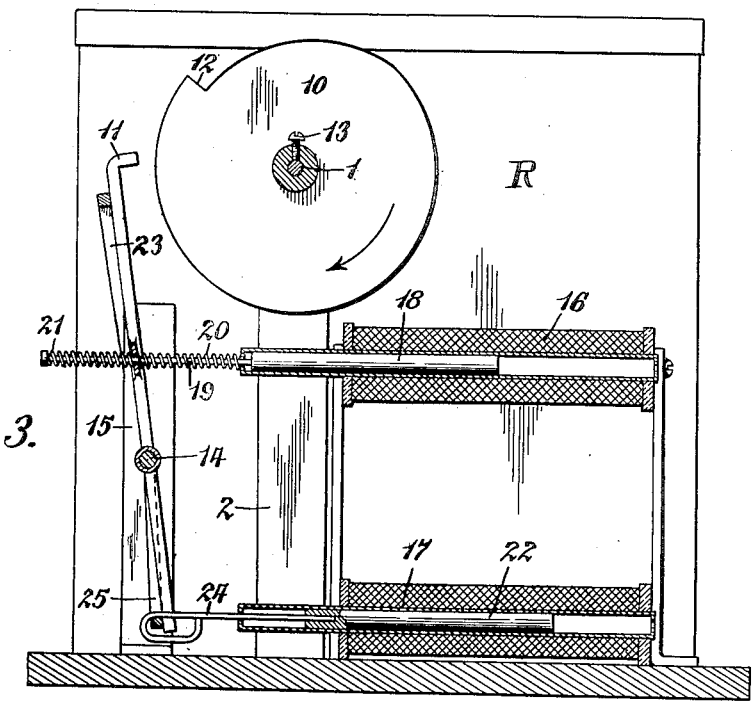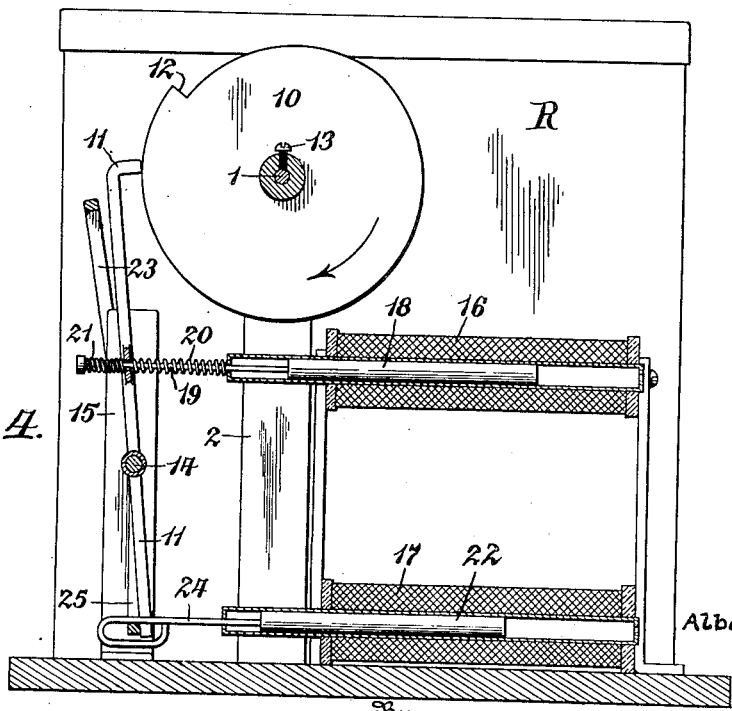

Sept. 18, 1934.  A. E. ELLINGER  1,974,207
MECHANISM FOR SELECTIVELY CONTROLLING THE ANGULAR MOVEMENT OF A SHAFT
Filed Feb. 18, 1929  3 Sheets-Sheet 3

Inventor
Albert E. Ellinger

By Popp and Powers
Attorney

Patented Sept. 18, 1934

1,974,207

UNITED STATES PATENT OFFICE 1,974,207

MECHANISM FOR SELECTIVELY CONTROLLING THE ANGULAR MOVEMENT OF A SHAFT

Albert E. Ellinger, Snyder, N. Y., assignor to Morris Goldstein, Buffalo, N. Y.

Application February 18, 1929, Serial No. 340,759

5 Claims. (Cl. 192—142)

This invention relates to a mechanism for selectively controlling the angular movement of a shaft or a part operatively connected therewith.

The principal object of the invention is to provide a manually controlled selective mechanism for automatically effecting the angular movement of a shaft to any one of a number of predetermined positions as desired.

Another object of the invention is to provide a simply constructed mechanism which will turn the shaft accurately to any position for which it is set or adjusted.

A further object is to provide a mechanism in which any one or more of the predetermined angular settings may be quickly and accurately changed.

Other objects reside in the details of the construction and the arrangement of the various parts as will be more fully pointed out hereinafter.

Generally stated, the invention contemplates the combination with a shaft of a series of manually operable selector switches which, upon the operation of any one switch, causes the shaft to be driven and, at the same time, renders operative a corresponding one of a series of selector elements whereby such element is conditioned to engage one of a series of members which are mounted to move with the shaft, and to lock or latch such member—and hence the shaft—against movement when a predetermined position is reached. The selector switches, selector elements and shaft members are provided in corresponding series, the number in each series depending upon the number of predetermined positions desired. Thus when any particular selector switch is operated, the corresponding selector element is rendered operative and the corresponding shaft member thereby engaged.

While the mechanism is generally useful for a variety of purposes, it is illustrated in the accompanying drawings as applied to a radio receiving set for controlling the tuning of the set to any of a predetermined number of wavelengths or kilocycles. By choosing the wavelengths of various radio broadcasting stations and adjusting the mechanism for controlling the movement of the tuning elements of the set to the various positions corresponding to such wavelengths, any desired station may thereafter be automatically tuned in simply by operating the proper selector switch.

In the accompanying drawings:

Figure 3 is a section along line 3—3 of Figure 2 with the lower coil energized and the upper coil deenergized.

Figure 4 is a section along a line corresponding to the line 3—3 of Figure 2, the lower coil in this view being deenergized and the upper coil energized.

Figure 1:
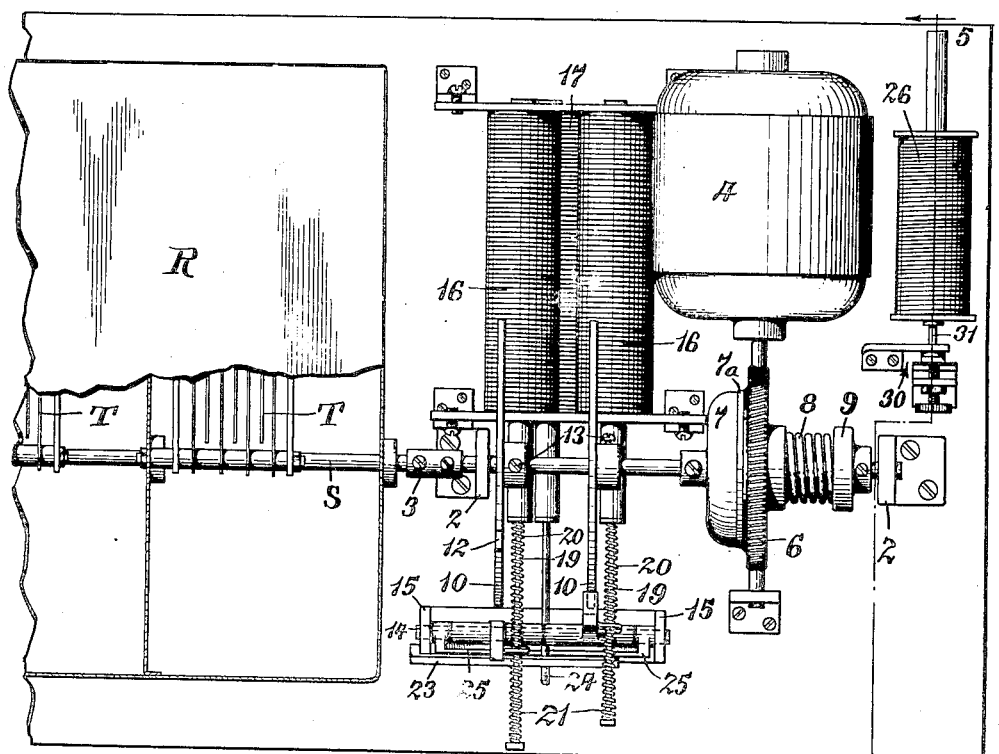
Figure 1 is a top plan view of the mechanism without the control circuits, the mechanism being shown as applied to a radio receiving set having its tuning elements mounted on a common shaft.
Figure 2:
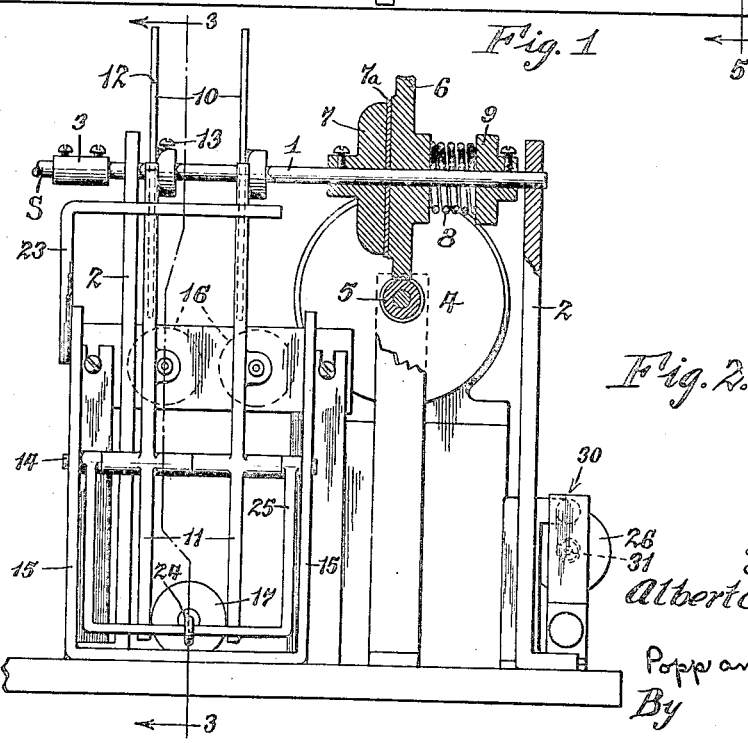
Figure 2 is a front elevation of the same.
Figure 5:
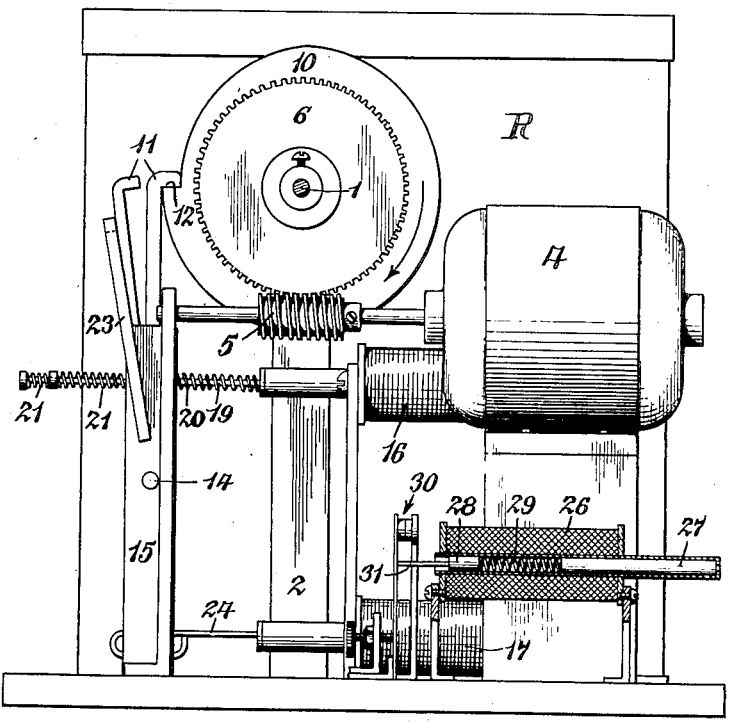
Figure 5 is a section along line 5—5 of Figure 1.

The shaft whose movement is to be controlled, is indicated at 1 and, as shown, is mounted on suitable bearing standards 2. It will, of course, be understood, that by controlling the movement of the shaft 1, the control of any part operatively connected to the shaft is thereby automatically effected. One end of the shaft is, therefore, connected through the coupling 3 to the shaft S upon which the tuning elements T of the radio set R, are mounted. Obviously an angular movement of the shaft will effect a similar movement of the tuning elements. Hence by controlling the movement of the shaft, the tuning of the radio set will automatically be controlled.

The movement of the shaft 1 is effected through a motor 4 to which it is connected through a worm 5, cooperating gear 6 and friction clutch, one part of which is indicated at 7. The worm 5 meshes with the gear 6 which is loosely mounted on the shaft 1 and which preferably forms a part of the clutch mechanism, the other clutch member being fixed to the shaft as indicated at 7. The gear 6 is resiliently pressed against the clutch member 7 by a spring 8, the spring being held in compression between the gear 6 and a shoulder 9 which, also, is fixed to the shaft 1. A friction disc 7a preferably is interposed between the gear 6 and clutch member 7. Obviously as the motor drives the gear 6, the pressure exerted on the clutch member 7 by virtue of the spring 8, will cause the shaft 1 to rotate unless and until it is locked against movement, in which case the clutch permits continued movement of the motor without binding or breakage of associated parts.

The invention, as stated, contemplates locking the shaft against movement at any one of a number of chosen or predetermined positions. For this purpose a plurality of latching means, corresponding in number to the number of predetermined positions desired, are provided and arranged for selective operation to lock or latch the shaft against further movement when it reaches the predetermined position desired.

The latching means include a series of cams 10 mounted to rotate with the shaft 1 and a corresponding series of latching elements or fingers 11 mounted adjacent the shaft 1. Only two cams 10 and two latching elements 11 are herein shown for the sake of clearness but it is to be understood that any number may be used as is found expedient. Each element 11 is adapted for independent pivotal movement into engagement with the periphery of its corresponding cam 10 and for latching engagement with a radial surface 12 or the like which may be formed in the cam at some point along its periphery. Such latching engagement is, of course, arranged in accordance with some desired predetermined position of the shaft 1.

It will be readily appreciated that various causes may, from time to time, render it desirable or necessary to change any one or more of the predetermined positions at which the shaft is stopped by the latching means. Generally speaking, this may be accomplished by adjusting either the cams 10 or the latching elements 11 angularly about the shaft 1. The adjustment of the cams affords the simplest means for securing this result in the present embodiment and, to this end, each cam is fixed to the shaft solely through the agency of a set screw 13 which naturally permits quick adjustment.

The latching elements 11 preferably are pivotally mounted intermediate their ends, upon a rod 14 which is suitably supported at opposite ends by brackets 15. The upper end of each element is bent to facilitate latching engagement with the radial surface 12 of its corresponding cam. The pivotal latching movement of each element is effected by individual solenoids 16 while the pivotal unlatching movement of all the elements is effected by a common solenoid 17.

The solenoids 16, hereinafter termed the selector coils, are mounted in any suitable manner. The bore of each element is provided with a projecting brass sleeve within which a sliding plunger 18 is arranged. The plunger 18 normally extends away from the center of the coil whereby when the coil is energized, the plunger is pulled toward the center, the resulting movement being utilized to effect the latching movement of the corresponding latching element. To this end, the plunger of each selector coil is connected to its respective latching element 11 by a rod 19. The rod 19 extends through the element 11 and carries a pair of springs 20 and 21 respectively, on either side of the element. Both springs are more or less under compression, the inner spring 20 serving normally to hold the element away from its cam and the outer spring 21 serving as a resilient connection between the element and the selector coil plunger.

The solenoid 17, hereinafter referred to as the restoring coil, is suitably mounted and similarly provided with a projecting brass sleeve and with an inner sliding plunger 22 which is normally offset from the center of the coil. The movement of the plunger 22 is, as stated, utilized to effect the unlatching movement of the latching elements, the extent of this movement being limited by a stopping bar 23. For this purpose, the plunger is connected to the elements 11 through a rod 24 and U-shaped member 25. The free ends of the U-shaped member are pivotally mounted on the rod 14, upon which the latching elements are mounted, while the body of the member 25 loosely engages the latching elements adjacent their lower ends, it being understood, of course, that the plunger rod 24 is connected to the body of the member 25.

The mechanism also includes a solenoid 26, hereinafter termed the cut-out coil, having a large plunger 27 and a small plunger 28, the large plunger being offset from the center of the coil and separated from the small plunger 28 by a spring 29. This arrangement is utilized to delay the opening of the contacts of a normally closed switch 30 for a very slight interval after the cutout coil has been energized. The small plunger 28 is, therefore, provided with a rod 31 which is arranged to extend adjacent one contact arm of the switch 30 and, when properly moved, to open the contacts thereof.

Figure 6:
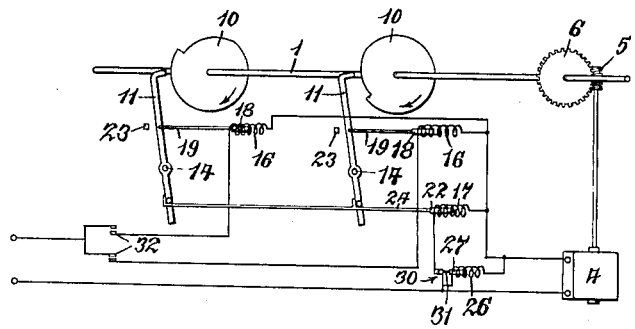
Figure 6 is a schematic view of the mechanism and the control arrangement therefor.

In the control arrangement which is shown in Figure 6, a series of manually operable switches 32 are provided, one switch for each desired predetermined position. Each selector switch 32 is connected in series with its corresponding selector coil 16 between one side of a suitable source of energy (not shown) and one side of the driving motor 4, the other side of the motor being connected to the other side of the source of energy. The restoring coil 17 and the cut-out coil 26 are placed in parallel with the motor, it being noted that the restoring coil circuit includes the cut-out switch 30.

When the mechanism, herein shown, is adjusted for controlling the movement of the shaft 1 to any of two predetermined positions, the shaft may be operated to the desired position simply by depressing the proper selector switch 32. It is evident from the arrangement shown in Figure 6 that such operation of the selector switch 32 not only energizes the corresponding selector coil 16, but at the same time also energizes the restoring coil 17, cut-out coil 26 and the motor 4. The energization of the selector coil 16 will, of course, tend to pull the corresponding latching element 11 into contact with its cam 10 but this action is momentarily prevented by the restoring coil 17. The restoring coil is designed to have a much stronger pulling effect than the selector coils 16 with the result that it moves the latching element away from the cam. The restoring coil, however, remains energized for a slight interval only, its circuit being opened by the delayed acting cut-out coil 26. As soon as the restoring coil 17 is deenergized, the selector coil 16 becomes effective to move the latching element 11 into engagement with its cam 10. In the meantime, the motor 4 rotates the shaft 1 and associated cams, the rotation of the shaft 1 continuing until the shaft 1 reaches the predetermined position desired at which point the radial surface 12 of the proper cam moves into engagement with the operative latching element to latch or lock the shaft in such position. The clutch permits the continued rotation of the motor 4, which may be stopped at any time simply by releasing the manually operable switch 32. Upon the release of the switch 32, all circuits are deenergized. The deenergization of the selector coil 16 will not, however, cause the associated latching element 11 to return to its initial position. While such element is urged away from the engaged cam by the inner spring 20, it is prevented from returning to its initial position by the friction between the element and the radial surface 12 of the engaged cam. It may be pointed out, however, that this element will be returned to its initial position upon the operation of either one of the manually operable switches 32, through the momentary restoring action of the restoring coil 17 as previously described. Hence in order to move the shaft 1 to the other predetermined position, it is only necessary to operate the other manual switch 32.

As long as the movement of the shaft 1 is to be effected through the motor 4, any element 11 which is latched to its respective cam 10 may be permitted to remain in such latched position. When it is desired, however, to move the shaft manually—this being permitted by the friction clutch without requiring the disengagement of the clutch parts—it is necessary to return the element to its initial position. This may be accomplished through the restoring coil 17 simply by a momentary operation of the switch 32. It may also be accomplished by manually moving the shaft in a direction reverse to that in which it turns when operated by the motor, whereby the inner spring 20 of the element becomes effective to return it to its initial position. The manual movement of the shaft in the embodiment illustrated, to any position may be accomplished by grasping and turning the shaft or any of the associated rotatable parts. Of course, where desired, a handle may be suitably incorporated in the mechanism for this purpose.

A feature of the invention resides in the ease with which a predetermined position may be changed. To do this it is only necessary to move the shaft to the position desired, move the desired latching element to the latching position and then loosen the set screw 13 of the corresponding cam to permit the angular movement of the cam about the shaft until the latching element and radial surface of the cam are brought into engagement at which point the set screw 13 is tightened to complete the adjustment. This arrangement, therefore, permits the adjustment to be made both quickly and accurately. Where the mechanism is applied to a radio set and a new station desired in place of an old one, the adjustment is made in the same manner after the tuning elements have been turned to the tuning position of the new station.

Another feature of the invention resides in the control arrangement utilized which permits the mechanism to be controlled from one or more distant points. Thus one set of manually operable switches 32 may be located at any point away from the mechanism for controlling its operation or several sets of switches 32 may be connected in multiple and variously located as, for example, in the various rooms of a building. Of course, where the mechanism is utilized to tune a radio receiving set to various predetermined wavelengths, it would be desirable in some remote control arrangements, to install sound reproducing instruments in the vicinity of the remote control as well as volume control. This, however, can be readily accomplished in various known ways and hence needs no illustration.

Having fully described my invention, I claim:

1. An arrangement for controlling the angular movement of a shaft comprising means for angularly moving said shaft, a member arranged for movement with said shaft, an element pivotally mounted for movement away from said member and for movement into engagement with said member to stop said shaft at a predetermined point, restoring means for moving said element away from said member, additional means for moving said element into engagement with said member, and circuit means for effecting the momentary operation of said restoring means and for immediately thereafter effecting the operation of said additional means.

2. An arrangement for controlling the angular movement of a shaft comprising a member arranged for movement with said shaft, an element pivotally mounted for movement away from said member and for movement into engagement with said member to stop said shaft at a predetermined point, and circuit controlled means operated from a single switch for driving said shaft, for initially moving said element away from said member and for immediately thereafter moving said element into engagement with said member.

3. An arrangement for controlling the angular movement of a shaft comprising a cam arranged for movement with said shaft, a latching element pivotally mounted for movement away from said cam and for movement into engagement with said cam to stop said shaft at a predetermined point, a control switch, and means set in operation upon the actuation of said switch for driving said shaft, for initially moving said latching element away from said cam and for immediately thereafter moving said latching element into engagement with said cam.

4. An arrangement for controlling the angular movement of a shaft comprising means for angularly moving said shaft, additional means arranged for movement with said shaft, a series of elements each mounted for independent movement into engagement with said additional means to stop said shaft at a different predetermined point, selectively operable means individual to each element for so operating it and means common to all elements for moving them away from said additional means.

5. An arrangement for controlling the angular movement of a shaft comprising means for angularly moving said shaft, a series of members arranged for movement with said shaft, a corresponding series of elements, one for each member, each element being adapted for independent movement into engagement with its respective member to stop said shaft at a different predetermined point, selectively operable means individual to each element for so operating it and means common to all elements for moving them away from said members.

ALBERT E. ELLINGER.